(12) United States Patent
Morton

(10) Patent No.: US 7,929,663 B2
(45) Date of Patent: Apr. 19, 2011

(54) X-RAY MONITORING

(75) Inventor: Edward James Morton, Guildford (GB)

(73) Assignee: Rapiscan Systems, Inc., Hawthorne, CA (US)

( * ) Notice: Subject to any disclaimer, the term of this patent is extended or adjusted under 35 U.S.C. 154(b) by 0 days.

(21) Appl. No.: 12/758,764

(22) Filed: Apr. 12, 2010

(65) Prior Publication Data

US 2010/0303295 A1 Dec. 2, 2010

Related U.S. Application Data

(63) Continuation of application No. 12/211,219, filed on Sep. 16, 2008, now Pat. No. 7,724,868, which is a continuation of application No. 10/554,655, filed as application No. PCT/GB2004/001751 on Apr. 23, 2004, now Pat. No. 7,440,543.

(30) Foreign Application Priority Data

Apr. 25, 2003 (GB) .................................. 0309385.3

(51) Int. Cl.
    *G01N 23/12* (2006.01)
(52) U.S. Cl. ................................. 378/53; 378/9; 378/10
(58) Field of Classification Search ................ 378/9, 10, 378/51–59, 62
    See application file for complete search history.

(56) References Cited

U.S. PATENT DOCUMENTS

| 3,768,645 | A | 10/1973 | Conway et al. |
|---|---|---|---|
| 4,105,922 | A | 8/1978 | Lambert et al. |
| 4,228,353 | A | 10/1980 | Johnson |
| 4,259,721 | A | 3/1981 | Kuznia |
| 4,266,425 | A | 5/1981 | Allport |
| 4,352,021 | A | 9/1982 | Boyd et al. |
| 4,868,856 | A | 9/1989 | Frith et al. |
| 4,987,584 | A | 1/1991 | Doenges |
| 5,033,106 | A | 7/1991 | Kita |
| 5,182,764 | A | 1/1993 | Peschmann et al. |
| 5,272,627 | A | 12/1993 | Maschhoff et al. |
| 5,313,511 | A | 5/1994 | Annis et al. |
| 5,319,547 | A | 6/1994 | Krug et al. |
| 5,367,552 | A | 11/1994 | Peschmann |
| 5,410,156 | A | 4/1995 | Miller |
| 5,467,377 | A | 11/1995 | Dawson |
| 5,490,196 | A | 2/1996 | Rudich et al. |

(Continued)

FOREIGN PATENT DOCUMENTS

DE 2729353 1/1979

(Continued)

OTHER PUBLICATIONS

PCT Search Report, Aug. 10, 2004, Morton, Edward James et al Search Report PCT/GB2004/001729.

(Continued)

*Primary Examiner* — Courtney Thomas
(74) *Attorney, Agent, or Firm* — Novel IP

(57) ABSTRACT

Apparatus for monitoring in real time the movement of a plurality of substances in a mixture, such as oil water and air flowing through a pipe comprises an X-ray scanner arranged to make a plurality of scans of the mixture over a monitoring period to produce a plurality of scan data sets, and control means arranged to analyze the data sets to identify volumes of each of the substances and to measure their movement. By identifying volumes of each of the substances in each of a number of layers and for each of a number of scans, real time analysis and imaging of the substance can be achieved.

21 Claims, 3 Drawing Sheets

U.S. PATENT DOCUMENTS

| | | | |
|---|---|---|---|
| 5,490,218 A | 2/1996 | Krug et al. |
| 5,557,108 A | 9/1996 | Tumer |
| 5,600,700 A | 2/1997 | Krug et al. |
| 5,606,167 A | 2/1997 | Miller |
| 5,642,393 A | 6/1997 | Krug et al. |
| 5,661,774 A | 8/1997 | Gordon et al. |
| 5,712,926 A | 1/1998 | Eberhard et al. |
| 5,796,802 A | 8/1998 | Gordon |
| 5,818,897 A | 10/1998 | Gordon |
| 5,838,758 A | 11/1998 | Krug et al. |
| 5,859,891 A | 1/1999 | Hibbard |
| 5,881,122 A | 3/1999 | Crawford et al. |
| 5,887,047 A | 3/1999 | Bailey et al. |
| 5,901,198 A | 5/1999 | Crawford et al. |
| 5,905,806 A | 5/1999 | Eberhard et al. |
| 5,909,477 A | 6/1999 | Crawford et al. |
| 5,910,973 A | 6/1999 | Grodzins |
| 5,930,326 A | 7/1999 | Rothschild et al. |
| 5,974,111 A | 10/1999 | Krug et al. |
| 5,982,843 A | 11/1999 | Bailey et al. |
| 6,021,174 A | 2/2000 | Campbell |
| 6,026,143 A | 2/2000 | Simanovsky et al. |
| 6,026,171 A | 2/2000 | Hiraoglu et al. |
| 6,035,014 A | 3/2000 | Hiraoglu et al. |
| 6,037,597 A | 3/2000 | Karavolos |
| 6,067,366 A | 5/2000 | Simanovsky et al. |
| 6,075,871 A | 6/2000 | Simanovsky et al. |
| 6,076,400 A | 6/2000 | Bechwati et al. |
| 6,078,642 A | 6/2000 | Simanovsky et al. |
| 6,088,423 A | 7/2000 | Krug et al. |
| 6,091,795 A | 7/2000 | Schafer et al. |
| 6,108,396 A | 8/2000 | Bechwati et al. |
| 6,111,974 A | 8/2000 | Hiraoglu et al. |
| 6,118,852 A | 9/2000 | Rogers et al. |
| 6,122,343 A | 9/2000 | Pidcock |
| 6,128,365 A | 10/2000 | Bechwati et al. |
| 6,163,591 A | 12/2000 | Benjamin |
| 6,181,765 B1 | 1/2001 | Sribar et al. |
| 6,183,139 B1 | 2/2001 | Solomon et al. |
| 6,185,272 B1 | 2/2001 | Hiraoglu et al. |
| 6,188,745 B1 | 2/2001 | Gordon |
| 6,195,444 B1 | 2/2001 | Simanovsky et al. |
| 6,216,540 B1 | 4/2001 | Nelson et al. |
| 6,218,943 B1 | 4/2001 | Ellenbogen |
| 6,236,709 B1 | 5/2001 | Perry et al. |
| 6,252,929 B1 | 6/2001 | Swift et al. |
| 6,256,404 B1 | 7/2001 | Gordon et al. |
| 6,269,142 B1 | 7/2001 | Smith |
| 6,272,230 B1 | 8/2001 | Hiraoglu et al. |
| 6,292,533 B1 | 9/2001 | Swift et al. |
| 6,304,629 B1 | 10/2001 | Conway et al. |
| 6,317,509 B1 | 11/2001 | Simanovsky et al. |
| 6,324,249 B1 | 11/2001 | Fazzio |
| 6,345,113 B1 | 2/2002 | Crawford et al. |
| 6,418,189 B1 | 7/2002 | Schafer |
| 6,429,578 B1 | 8/2002 | Danielsson et al. |
| 6,430,255 B2 | 8/2002 | Fenkart et al. |
| 6,445,765 B1 | 9/2002 | Frank et al. |
| 6,459,755 B1 | 10/2002 | Li |
| 6,459,761 B1 | 10/2002 | Grodzins et al. |
| 6,459,764 B1 | 10/2002 | Chalmers et al. |
| 6,507,025 B1 | 1/2003 | Verbinski et al. |
| 6,546,072 B1 | 4/2003 | Chalmers |
| 6,556,653 B2 | 4/2003 | Hussein |
| 6,563,906 B2 | 5/2003 | Hussein et al. |
| 6,590,956 B2 | 7/2003 | Fenkart et al. |
| 6,618,466 B1 | 9/2003 | Ning |
| 6,647,091 B2 | 11/2003 | Fenkart et al. |
| 6,647,094 B2 | 11/2003 | Harding et al. |
| 6,647,095 B2 | 11/2003 | Hsieh |
| 6,687,333 B2 | 2/2004 | Carroll et al. |
| 6,690,766 B2 | 2/2004 | Kresse |
| 6,707,879 B2 | 3/2004 | McClelland et al. |
| 6,715,533 B2 | 4/2004 | Kresse |
| 6,721,387 B1 | 4/2004 | Naidu et al. |
| 6,735,271 B1 | 5/2004 | Rand et al. |
| 6,737,652 B2 | 5/2004 | Lanza et al. |
| 6,748,043 B1 | 6/2004 | Dobbs |
| 6,754,298 B2 | 6/2004 | Fessler |
| 6,770,884 B2 | 8/2004 | Bryman |
| 6,775,348 B2 | 8/2004 | Hoffman |
| 6,788,761 B2 | 9/2004 | Bijjani et al. |
| 6,813,374 B1 | 11/2004 | Karimi et al. |
| 6,816,571 B2 | 11/2004 | Bijjani et al. |
| 6,827,265 B2 | 12/2004 | Knowles et al. |
| 6,830,185 B2 | 12/2004 | Tsikos et al. |
| 6,837,432 B2 | 1/2005 | Tsikos et al. |
| 6,856,667 B2 | 2/2005 | Ellengogen |
| 6,859,514 B2 | 2/2005 | Hoffman |
| 6,901,135 B2 | 5/2005 | Fox et al. |
| 6,906,329 B2 | 6/2005 | Bryman |
| 6,907,101 B2 | 6/2005 | Hoffman |
| 6,922,455 B2 | 7/2005 | Jurczyk et al. |
| 6,922,460 B2 | 7/2005 | Skatter et al. |
| 6,922,461 B2 | 7/2005 | Kang et al. |
| 6,933,504 B2 | 8/2005 | Hoffman et al. |
| 6,934,354 B2 | 8/2005 | Hoffman |
| 6,940,071 B2 | 9/2005 | Ramsden et al. |
| 6,944,264 B2 | 9/2005 | Bijjani et al. |
| 6,947,517 B2 | 9/2005 | Hoffman |
| 6,950,492 B2 | 9/2005 | Besson |
| 6,950,493 B2 | 9/2005 | Besson |
| 6,952,163 B2 | 10/2005 | Huey et al. |
| 6,953,935 B1 | 10/2005 | Hoffman |
| 6,957,913 B2 | 10/2005 | Renkart et al. |
| 6,962,289 B2 | 11/2005 | Vatan et al. |
| 6,968,030 B2 | 11/2005 | Hoffman |
| 6,968,034 B2 | 11/2005 | Ellengogen |
| 6,971,577 B2 | 12/2005 | Tsikos et al. |
| 6,973,158 B2 | 12/2005 | Besson |
| 6,975,698 B2 | 12/2005 | Katcha et al. |
| 6,978,936 B2 | 12/2005 | Tsikos et al. |
| 6,980,627 B2 | 12/2005 | Qiu et al. |
| 6,990,171 B2 | 1/2006 | Toth et al. |
| 6,990,172 B2 | 1/2006 | Toth et al. |
| 6,991,371 B2 | 1/2006 | Georgeson et al. |
| 6,996,209 B2 | 2/2006 | Marek |
| 7,010,083 B2 | 3/2006 | Hoffman |
| 7,016,459 B2 | 3/2006 | Ellenbogen et al. |
| 7,020,241 B2 | 3/2006 | Beneke et al. |
| 7,020,242 B2 | 3/2006 | Ellengogen |
| 7,023,956 B2 | 4/2006 | Heaton et al. |
| 7,023,957 B2 | 4/2006 | Bijjani et al. |
| 7,027,553 B2 | 4/2006 | Dunham et al. |
| 7,027,554 B2 | 4/2006 | Gaultier et al. |
| 7,031,430 B2 | 4/2006 | Kaucic, Jr. et al. |
| 7,031,434 B1 | 4/2006 | Saunders et al. |
| 7,034,313 B2 | 4/2006 | Hoffman |
| 7,039,154 B1 | 5/2006 | Ellenbogen et al. |
| 7,045,787 B1 | 5/2006 | Verbinski et al. |
| 7,046,756 B2 | 5/2006 | Hoffman |
| 7,046,761 B2 | 5/2006 | Ellenbogen et al. |
| 7,050,536 B1 | 5/2006 | Fenkart et al. |
| 7,054,408 B2 | 5/2006 | Jiang et al. |
| 7,062,009 B2 | 6/2006 | Karimi et al. |
| 7,062,011 B1 | 6/2006 | Tybinkowski et al. |
| 7,062,074 B1 | 6/2006 | Beneke |
| 7,064,334 B2 | 6/2006 | Hoffman et al. |
| 7,065,175 B2 | 6/2006 | Green |
| 7,065,179 B2 | 6/2006 | Block et al. |
| 7,068,750 B2 | 6/2006 | Toth et al. |
| 7,068,751 B2 | 6/2006 | Toth et al. |
| 7,072,434 B1 | 7/2006 | Tybinkowski et al. |
| 7,076,029 B2 | 7/2006 | Toth et al. |
| 7,078,699 B2 | 7/2006 | Seppi |
| 7,081,628 B2 | 7/2006 | Granfors et al. |
| 7,084,404 B2 | 8/2006 | Hoffman et al. |
| 7,087,902 B2 | 8/2006 | Wang et al. |
| 7,088,799 B2 | 8/2006 | Hoffman |
| 7,090,133 B2 | 8/2006 | Zhu |
| 7,092,481 B2 | 8/2006 | Hoffman |
| 7,092,485 B2 | 8/2006 | Kravis |
| 7,103,137 B2 | 9/2006 | Seppi et al. |
| 7,110,488 B2 | 9/2006 | Katcha et al. |
| 7,112,797 B2 | 9/2006 | Hoge |
| 7,116,749 B2 | 10/2006 | Besson |
| 7,116,751 B2 | 10/2006 | Ellenbogen et al. |

| | | |
|---|---|---|
| 7,119,553 B2 | 10/2006 | Yang et al. |
| 7,123,681 B2 | 10/2006 | Ellenbogen et al. |
| 7,127,027 B2 | 10/2006 | Hoffman |
| 7,130,374 B1 | 10/2006 | Jacobs et al. |
| 7,133,491 B2 | 11/2006 | Bernardi et al. |
| 7,136,450 B2 | 11/2006 | Ying et al. |
| 7,136,451 B2 | 11/2006 | Naidu et al. |
| 7,139,367 B1 | 11/2006 | Le |
| 7,139,406 B2 | 11/2006 | McClelland et al. |
| 7,149,278 B2 | 12/2006 | Arenson et al. |
| 7,149,339 B2 | 12/2006 | Veneruso |
| 7,155,812 B1 | 1/2007 | Peterson et al. |
| 7,158,611 B2 | 1/2007 | Heismann et al. |
| 7,164,747 B2 | 1/2007 | Ellenbogen et al. |
| 7,164,750 B2 | 1/2007 | Nabors et al. |
| 7,166,458 B2 | 1/2007 | Ballerstadt et al. |
| 7,167,539 B1 | 1/2007 | Hoffman |
| 7,173,998 B2 | 2/2007 | Hoffman et al. |
| 7,177,387 B2 | 2/2007 | Yasunaga et al. |
| 7,177,391 B2 | 2/2007 | Chapin et al. |
| 7,190,757 B2 | 3/2007 | Ying et al. |
| 7,197,113 B1 | 3/2007 | Katcha et al. |
| 7,197,172 B1 | 3/2007 | Naidu et al. |
| 7,215,731 B1 | 5/2007 | Basu et al. |
| 7,215,738 B2 | 5/2007 | Muenchau et al. |
| 7,218,704 B1 | 5/2007 | Adams et al. |
| 7,224,763 B2 | 5/2007 | Naidu et al. |
| 7,224,765 B2 | 5/2007 | Ellenbogen |
| 7,224,766 B2 | 5/2007 | Jiang et al. |
| 7,224,769 B2 | 5/2007 | Turner |
| 7,233,640 B2 | 6/2007 | Ikhlef et al. |
| 7,236,564 B2 | 6/2007 | Hopkins et al. |
| 7,238,945 B2 | 7/2007 | Hoffman et al. |
| 7,247,856 B2 | 7/2007 | Hoge |
| 7,251,310 B2 | 7/2007 | Smith |
| 7,260,170 B2 | 8/2007 | Arenson et al. |
| 7,260,171 B1 | 8/2007 | Arenson et al. |
| 7,260,172 B2 | 8/2007 | Arenson et al. |
| 7,260,173 B2 | 8/2007 | Wakayama et al. |
| 7,260,174 B2 | 8/2007 | Hoffman et al. |
| 7,260,182 B2 | 8/2007 | Toth et al. |
| 7,263,160 B2 | 8/2007 | Schlomka et al. |
| 7,266,180 B1 | 9/2007 | Saunders et al. |
| 7,272,429 B2 | 9/2007 | Walker et al. |
| 7,274,767 B2 | 9/2007 | Clayton et al. |
| 7,277,577 B2 | 10/2007 | Ying et al. |
| 7,279,120 B2 | 10/2007 | Cheng et al. |
| 7,280,631 B2 | 10/2007 | De Man et al. |
| 7,282,727 B2 | 10/2007 | Retsky |
| 7,283,604 B2 | 10/2007 | De Man et al. |
| 7,283,609 B2 | 10/2007 | Possin et al. |
| 7,295,019 B2 | 11/2007 | Yang et al. |
| 7,298,812 B2 | 11/2007 | Tkaczyk et al. |
| 7,302,083 B2 | 11/2007 | Larson et al. |
| 7,308,073 B2 | 12/2007 | Tkaczyk et al. |
| 7,308,074 B2 | 12/2007 | Jiang et al. |
| 7,308,077 B2 | 12/2007 | Bijjani et al. |
| 7,317,195 B2 | 1/2008 | Eikman |
| 7,317,390 B2 | 1/2008 | Huey et al. |
| 7,319,737 B2 | 1/2008 | Singh |
| 7,324,625 B2 | 1/2008 | Eilbert |
| 7,327,853 B2 | 2/2008 | Ying et al. |
| 7,330,527 B2 | 2/2008 | Hoffman et al. |
| 7,330,535 B2 | 2/2008 | Arenson et al. |
| 7,333,589 B2 | 2/2008 | Ellenbogen et al. |
| 7,335,887 B1 | 2/2008 | Verbinski et al. |
| 7,336,769 B2 | 2/2008 | Arenson et al. |
| 2001/0022346 A1 | 9/2001 | Katagami et al. |
| 2002/0031202 A1 | 3/2002 | Callerame et al. |
| 2002/0176531 A1 | 11/2002 | McClelland et al. |
| 2003/0031352 A1 | 2/2003 | Nelson et al. |
| 2004/0120454 A1 | 6/2004 | Ellenbogen et al. |
| 2004/0213378 A1 | 10/2004 | Zhou et al. |
| 2004/0252807 A1 | 12/2004 | Skatter et al. |
| 2004/0258305 A1 | 12/2004 | Burnham et al. |
| 2005/0031075 A1 | 2/2005 | Hopkins et al. |
| 2005/0053189 A1 | 3/2005 | Gohno et al. |
| 2005/0105682 A1 | 5/2005 | Heumann et al. |
| 2005/0111610 A1 | 5/2005 | De Man et al. |
| 2005/0157925 A1 | 7/2005 | Lorenz |
| 2005/0281390 A1 | 12/2005 | Johnson et al. |
| 2006/0018428 A1 | 1/2006 | Li et al. |
| 2006/0113163 A1 | 6/2006 | Hu et al. |
| 2006/0273259 A1 | 12/2006 | Li et al. |
| 2007/0003003 A1 | 1/2007 | Seppi et al. |
| 2007/0096030 A1 | 5/2007 | Li et al. |
| 2007/0110215 A1 | 5/2007 | Hu et al. |
| 2007/0133740 A1 | 6/2007 | Kang et al. |
| 2007/0183568 A1 | 8/2007 | Kang et al. |

FOREIGN PATENT DOCUMENTS

| | | |
|---|---|---|
| EP | 0 432 568 | 6/1991 |
| EP | 0 531 993 | 3/1993 |
| EP | 0 584 871 | 3/1994 |
| EP | 0 924 742 | 6/1999 |
| EP | 0 930 046 | 7/1999 |
| EP | 1 277 439 | 1/2003 |
| EP | 1374776 | 1/2004 |
| FR | 2328280 | 5/1977 |
| GB | 1497396 | 1/1978 |
| GB | 1526041 | 9/1978 |
| GB | 2 015 245 | 9/1979 |
| GB | 2089109 | 6/1982 |
| GB | 2 212 903 | 8/1989 |
| GB | 2356453 | 5/2001 |
| GB | 2437777 | 11/2007 |
| JP | 570175247 | 10/1982 |
| JP | 60 0015546 | 1/1985 |
| JP | 60 0021440 | 2/1985 |
| JP | 2004 079128 | 3/1992 |
| JP | 10211196 | 8/1998 |
| JP | 2001 176408 | 6/2001 |
| WO | WO 95/28715 | 10/1995 |
| WO | WO 99/60387 | 11/1999 |
| WO | WO 03/051201 | 6/2003 |
| WO | WO 03/105159 | 12/2003 |
| WO | WO2004/097889 | 11/2004 |
| WO | WO 2004/111625 | 12/2004 |
| WO | WO 2005/084351 | 9/2005 |
| WO | WO 2006/135586 | 12/2006 |

OTHER PUBLICATIONS

PCT Search Report, Aug. 10, 2004, Morton, Edward James et al Search Report PCT/GB2004/001741.

PCT Search Report, Aug. 10, 2004, Morton, Edward James et al Search Report PCT/GB2004/001731.

PCT Search Report, Aug. 10, 2004, Morton, Edward James et al Search Report PCT/GB2004/001732.

PCT Search Report, Aug. 10, 2004, Morton, Edward James et al Search Report PCT/GB2004/001751.

PCT Search Report, Aug. 10, 2004, Morton, Edward James et al Search Report PCT/GB2004/001747.

Development of ultra-fast X-ray computed tomography scanner system INS 98-43 6068772 A9823-8760J016 (PHA); B9812-7510B-113 (EEA) NDN-174-0606-8771-7 Hori, K.; Fujimoto, T.; Kawanishi, K. Editor- Nalcioglu, O. Abbreviated Journal Title- 1997 IEEE Nuclear Science Symposium Conference Record (Cat. No. 97CH36135) Part No.- vol. 2 1997 pp. 1003-1008 vol. 2 2 vol. xlviii+1761 page(s) ISBN- 0 7803 4258 5.

US 5,987,079, 11/1999, Scott et al. (withdrawn)

X-RAY MONITORING

CROSS REFERENCE

The present application is a continuation of U.S. patent Ser. No. 12/211,219, which was filed on Sep. 16, 2008, now U.S. Pat. No. 7,724,868 which is continuation of U.S. patent Ser. No. 10/554,655, filed Oct. 25,2005, which issued as U.S. Pat. No. 7,440,543 and is a national stage application of PCT/GB2004/001751, filed on Apr. 23, 2004 that relies on Great Britain Patent Application Number 0309385.3, filed on Apr. 25, 2003, for priority.

BACKGROUND OF THE INVENTION

The present invention relates to the monitoring of mixtures, and in particular to real time monitoring using X-ray scanning It has application in a number of fields were the monitoring and imaging of mixtures is required, and is particularly applicable to the measurement of the flow rates of the different fractions in moving mixtures of fluids, such as the measurement of oil flow from oil wells. It is also applicable to slurry flow monitoring and measurement, the monitoring of fluidization processes, and in the monitoring of mixing processes.

Typically, an oil well is one of a number of wells that collectively form an oil field. As well as extracting oil, water and gas from an individual oil well, it is sometimes necessary to recycle water down an oil well back into the ground. Typically, this pumped water is used to facilitate diffusion of oil through the porous rocks in the ground towards a well (or wells) for subsequent collection. By careful design of pumping and extraction rates, it is possible to maximize the yield of oil from the field.

Often, the output from several extracting oil wells are joined into a single pipeline for subsequent downstream processing. To optimize the production process, it is necessary to know the fraction of oil and water in the liquid phase and also to know the volumes of oil and water produced by each well in the field. By combining this information with an understanding of the geophysics and seismology data of the field itself, it is believed to be possible to improve on the quantity of oil produced from the field and to reduce the cost of production. Such measurements of oil and water phase fraction and velocity require instrumentation to be placed at the well head.

Known instrumentation for this purpose relies on measurement of linear attenuation coefficient of the flow using a dual-energy gamma measurement once the flow has been homogenized by use of a mechanical system. A second known approach is to measure electrical properties of the fluid (including permittivity and conductivity) and from this to infer phase fraction of oil and water.

SUMMARY OF THE INVENTION

The present invention provides apparatus for monitoring in real time the movement of a plurality of substances in a mixture, the apparatus comprising an X-ray scanner arranged to make a plurality of scans of the mixture over a monitoring period to produce a plurality of scan data sets, and control means arranged to analyze the data sets to identify volumes of each of the substances and to measure their movement.

Preferably the apparatus is arranged, on each scan, to produce a data set relating to a layer of the mixture. More preferably the control means is arranged to define a plurality of volume elements in said layer and to use a measure of the X-ray attenuation in each of said volume elements to form the data set. Still more preferably the control means is arranged to use the data sets to determine the amount of at least one of the substances in said layer.

Preferably the control means is arranged to use the data sets from each of the scans to determine a time averaged value of the amount of said at least one substance.

Preferably the scanner is arranged to produce data sets relating to a plurality of layers of the mixture, the layers being in different positions from each other. More preferably the control means is arranged to use the data sets relating to said plurality of layers to measure movement of at least one of the substances. Still more preferably the control means is arranged to track the movement of regions of said substance through the plurality of layers to determine a flow velocity of said substance.

The control means may be arranged to measure the movement of a region of a first one of the substances, to determine a measure of the buoyancy of said region relative to at least one other substance, and to measure the movement of said at least one other substance using the movement of said region and said buoyancy.

Preferably the control means is arranged to define a model for calculating a parameter of movement of the substances on the basis of a number of variables, to produce a measured value of the parameter from the scan data sets, and to determine at least one of said variables from the measured value and the model.

The control means may be arranged to determine a flow rate of at least one of the substances, the flow rate being defined as the amount of said substance flowing through a predetermined region in a predetermined time.

Preferably the control means is arranged to analyze a scan data set in two stages, one stage providing a lower spatial resolution and higher contrast resolution than the other. In this case the control means is preferably arranged to use the higher spatial resolution analysis to identify volumes of a first of said substances and to use the higher contrast analysis to distinguish between volumes of two further substances. For example the control means may be arranged to use the high spatial resolution analysis to adjust a measure of X-ray attenuation, of volume elements defined in the low spatial resolution analysis, to account for the presence in said volume elements of the first substance. This is particularly useful where the mixture contains two substances of similar X-ray attenuation coefficient, for example both being in a liquid phase or both being in a solid phase, such as oil and water, and another substance of a significantly different X-ray attenuation coefficient, for example being of a different phase e.g. a gas, such as air.

The scanner may be arranged to be placed around a pipe or other conduit to measure the movement of the substances through the pipe or conduit. Alternatively the scanner may be placed adjacent to or around a container in which the mixture is undergoing a fluidization or mixing process.

The apparatus may further comprise display means arranged to display an image of the mixture controlled by the control means. For example the display means may be arranged to display a video image of the mixture.

The present invention further provides a method of monitoring in real time the movement of a plurality of substances in a mixture, the method comprising making a plurality of X-ray scans of the mixture over a monitoring period to produce a plurality of scan data sets, and analyzing the data sets to identify volumes of each of the substances and to measure their movement.

BRIEF DESCRIPTION OF THE DRAWINGS

Preferred embodiments of the present invention will now be described by way of example only with reference to the accompanying drawings in which.

DETAILED DESCRIPTION OF THE DRAWINGS

Figure 1:
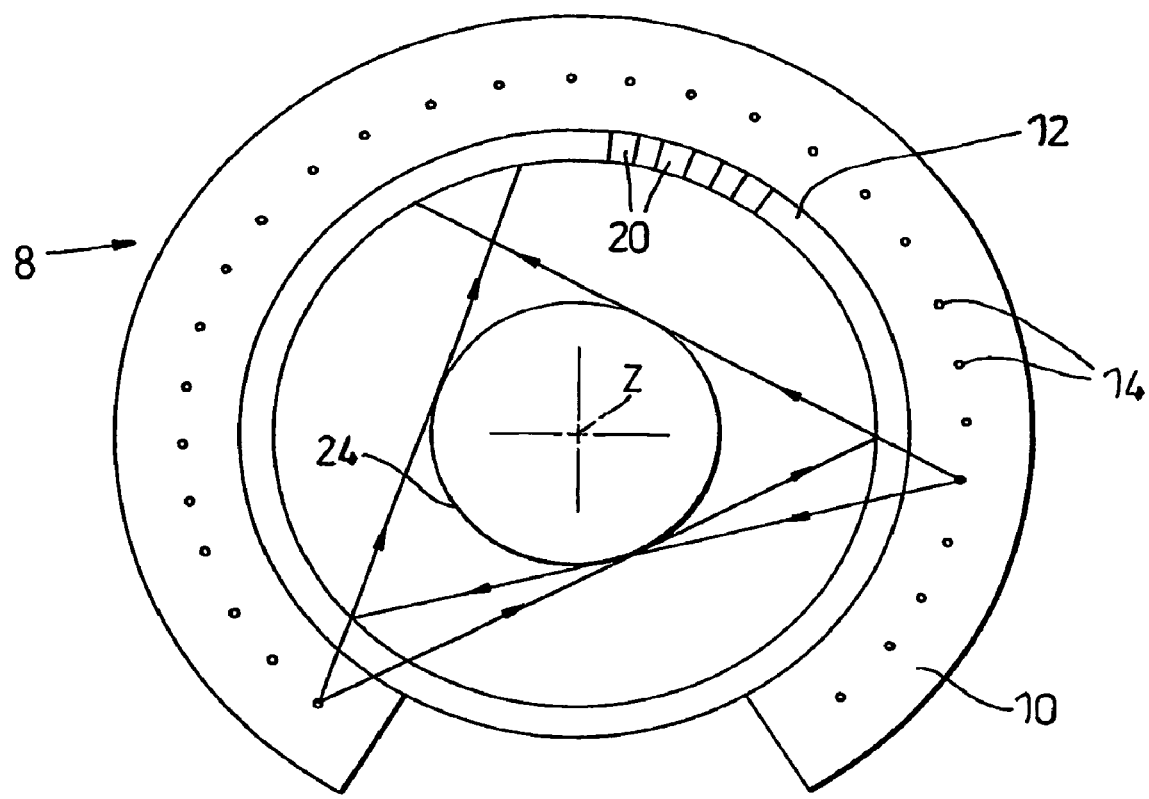
FIG. 1 is a transverse section through an X-ray scanning apparatus according to a first embodiment of the invention.
Figure 2:
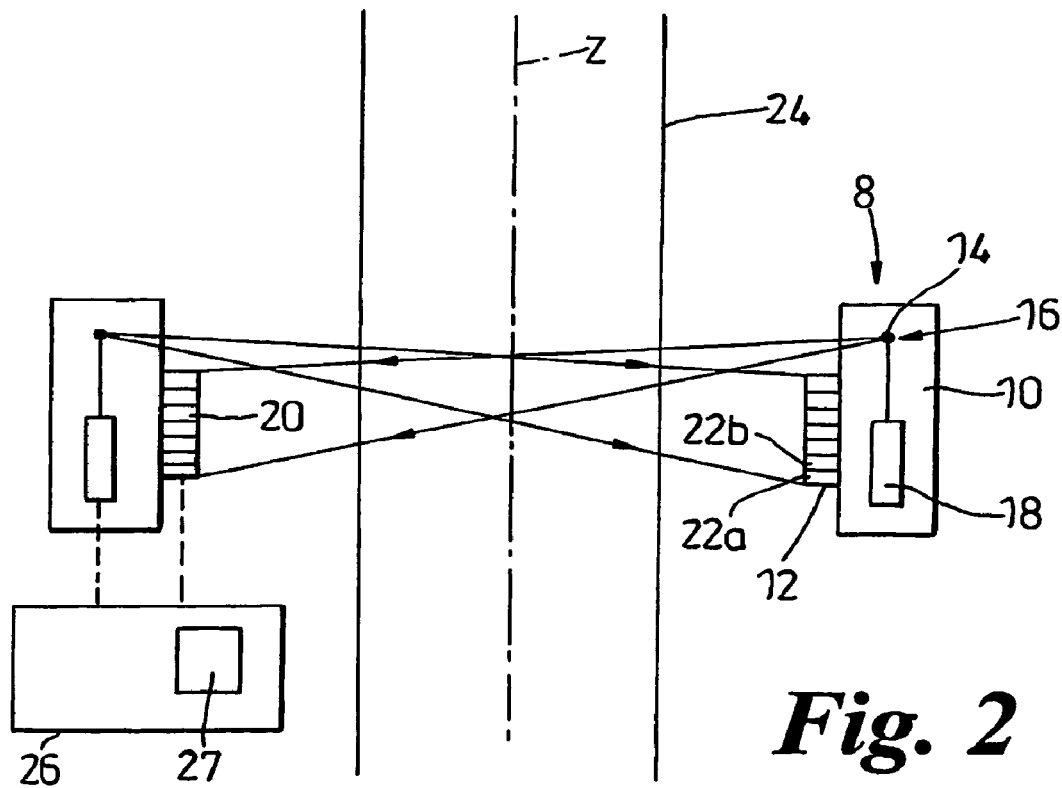
FIG. 2 is a longitudinal section through the apparatus of FIG. 1.

Referring to FIGS. 1 and 2 an X-ray scanner 8 according to a first embodiment of the invention comprises an annular multi-focus X-ray tube 10 and an annular segmented X-ray sensor array 12 located radially inwards of the X-ray tube 10. The tube 10 comprises a number of X-ray sources 14 spaced around the tube 10, each X-ray source 14 comprising a target 16 at which electrons are directed from an electron source 18. The sensor array 12 is cylindrical in form and comprises a number of sensor elements 20 arranged in a number of adjacent rings 22a, 22b. The X-ray sources 14 are just above the top of the sensor array 12 and each source 14 is arranged to direct X-rays over the part of the sensor array 12 nearest to it, and towards a wide area of the sensor array 12 on the opposite side of the scanner axis Z. The scanner 8 is placed around an oil pipe 24 so that the pipe 24 lies on the scanner axis Z. The X-ray system would normally be operated at 100-150 kVp tube voltage and 10-50 mA beam current.

A control unit 26 is connected to each of the electron sources 18 so that it can control which X-ray source 14 is active at any time, and also to each of the sensor elements 20 in the sensor array 12 so that it can determine the strength of the X-ray radiation reaching each sensor element 20 at any time. The control unit 26 controls the X-ray sources to scan repeatedly at a scan period of between 0.1 and 10 ms per scan to acquire scan data, which can be analyzed to provide quantitative outputs, or to provide images of the mixture on a screen 27.

Figure 5:
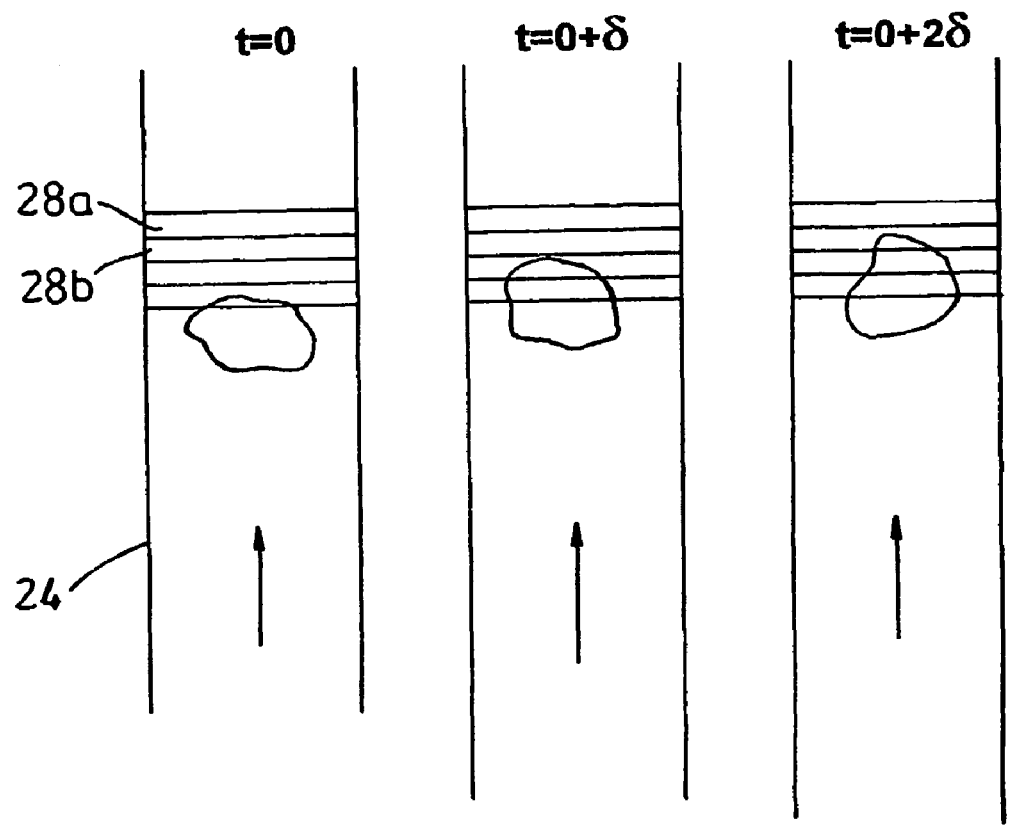
FIG. 5 shows how flow velocity is determined using the apparatus of FIG. 1.

During each scan, each of the X-ray sources 14 emits once in turn, and for each source an image data set is formed for each of a number of image rings, one image ring for each ring 22a, 22b of the sensor array 12. Each image ring is at a slight angle, in this case between 1 and 5 degrees from the normal to the pipe axis Z, due to the axial offset between the sources 14 and the sensor array 12. The control unit 26 processes the image data sets from each of the image rings produced in the scan to produce a tomographic image data set made up of a number of plane image data sets for respective image planes 28a, 28b spaced along a length of the pipe 24 as shown in FIG. 5. Typically there are between 2 and 14 planes at a plane spacing of 1 to 2 mm. Each plane image data set includes a grey level for each pixel of the image, which represents the X-ray attenuation coefficient of each of a number of corresponding volume elements (voxels) in the respective 'plane' or layer of the imaged volume. The layer has a thickness equal to the thickness of one volume element, making the plane image essentially two dimensional.

The tomographic image data sets are then processed in two stages, the first to determine the relative volumes of the various fractions in the pipe, in this case oil, water and gas, and the second to determine the absolute velocities of the oil, water and gas phases. The volume flow rate for each phase can then be determined as the product of phase fraction with phase velocity.

Figure 3:
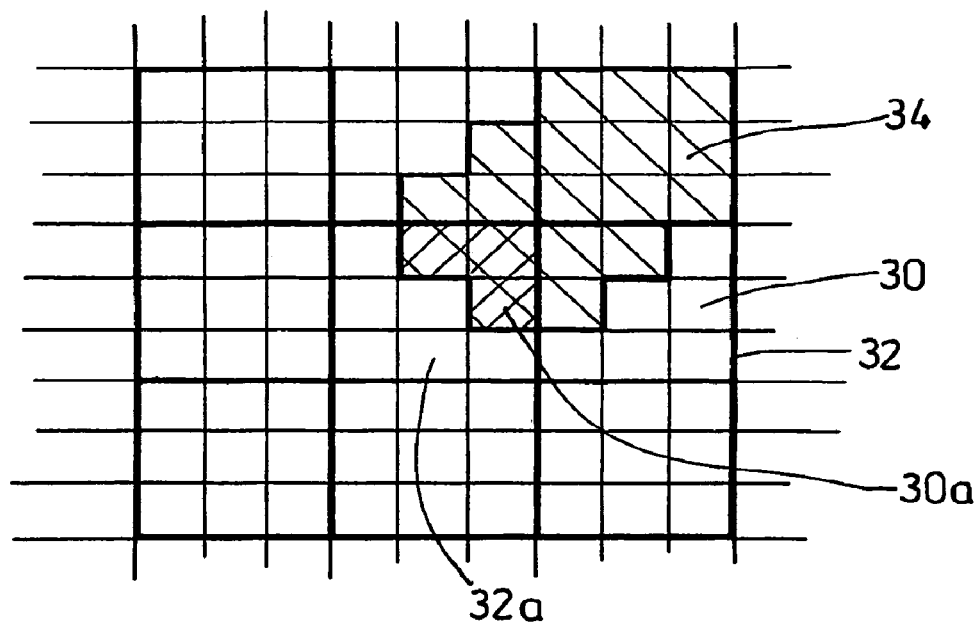
FIG. 3 shows part of a map of a volume produced by the apparatus of FIG. 1.

To determine the phase fractions two image reconstructions are generated for each image plane 28a, one at low spatial resolution but good contrast resolution and one at high spatial resolution but lower contrast resolution. Both image reconstructions use the same initial projection data set. The area of each image pixel corresponds to the cross sectional area of the corresponding voxel, and both reconstructions have the same slice thickness. FIG. 3 shows an area of the image plane 28a divided at both high and low resolution. Typically, the high-resolution image will be reconstructed with smaller pixels 30 of 2 mm pixel dimensions, while a low-resolution image may be reconstructed with larger pixels 32 of up to 10 mm pixel dimensions. In the example shown the smaller pixels 30 are of 2 mm dimension and the larger pixels 32 are of 6 mm dimension. In each image, each pixel will have a grey level indicative of the attenuation coefficient of the substance or substances in the corresponding volume element. For any volume elements which contain only one fraction, the grey level will be at one of three possible levels corresponding to oil, water and air. For any volume element containing more than one fraction, the grey level will be at a level between these three levels.

Firstly, the high resolution image is segmented, using a suitable binary segmentation process, to determine which of the smaller pixels 30 represent the gas phase, and which represent the liquid phase. This relies on the fact that the gas phase reconstructs back to a very different signal level from that of the liquid phase, so such binary segmentation is straightforward. The number of pixels representing the gas phase therefore gives a measure of the gas fraction in the image layer. In FIG. 3, the area 34 is representative of a gas bubble which fills one of the large pixels 32 and a further 9 of the small pixels 30, spread between 3 of the large pixels.

Next, any gas voxels that are identified from the high spatial resolution scan are used to apply a partial volume correction to the low spatial resolution scan as shown in FIG. 3. This correction identifies that a fraction of the low spatial resolution pixel is filled with gas, and that therefore the measured grey level is lower than possible for a liquid phase only voxel. For example the middle large pixel 32a includes 3 out of 9 small pixels 30 representing gas voxels. These are the shaded pixels 30a.

A linear volume correction is applied to correct the grey level of the large pixel 32a to account for the gas partial fraction within the corresponding voxel: true=11−V gas actual where true=partial volume corrected grey level, $V_{gas}$=gas fraction of large pixel and actual=actual reconstructed grey level.

When these corrections have been made, the large pixels 32 are segmented on the basis of the corrected grey levels into those representing voxels in which gas predominates, those representing voxels in which water predominates, and those representing voxels in which oil predominates. This therefore provides a measure of the instantaneous volumetric fractions of air, oil and water in one image plane 28a. It also provides a tomographic image of the mixture flowing through the pipe 24 which can be displayed on the screen 27.

Figure 4:
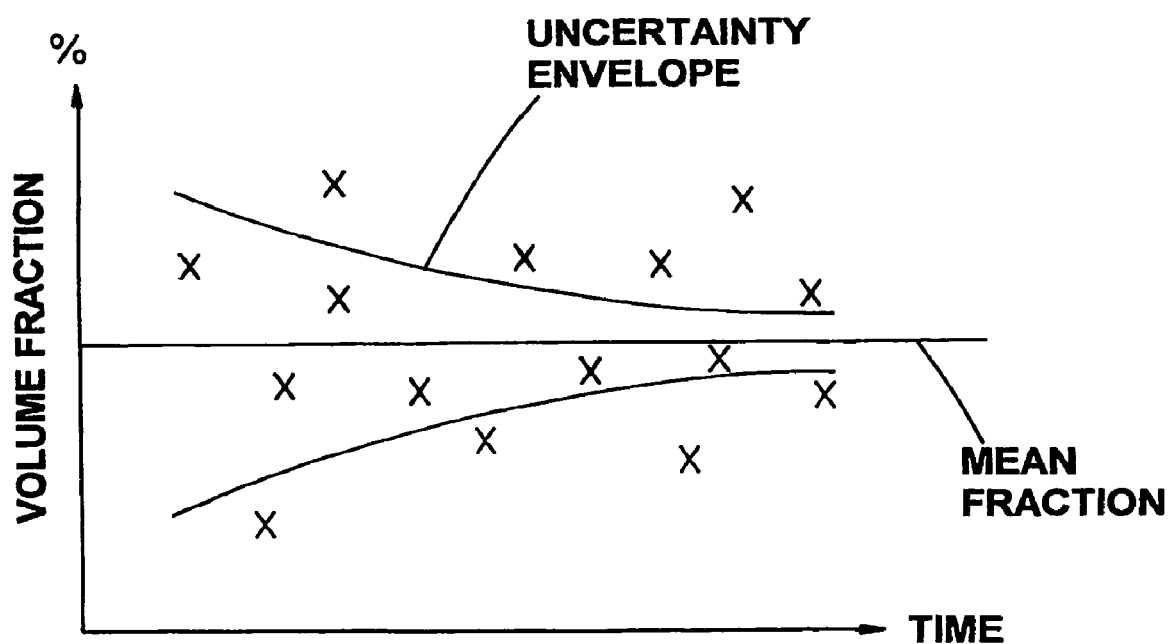
FIG. 4 is a graph showing how the error in the volume measurement using the apparatus of FIG. 1 decreases with time.

Since the flow is continuously changing, it is necessary to repeat this measurement multiple times to achieve a time-averaged measurement of the volumetric fractions of the three phases. This is shown graphically in FIG. 4 which shows a number of consecutive instantaneous phase volume fraction measurements 40 which are spread around the mean fraction. As the number of measurements increases the uncertainty in the mean volume fraction decreases. Measurement uncertainty depends on the number of voxels per image and the photon statistics within a voxel.

Typically, uncertainty in phase fraction within a single scan is at the 5% level. Uncertainty reduces to less than 1% after averaging of information from multiple data sets.

Also as a new image is produced for each scan, and the scanning period is typically between 0.1 and 10 ms as indicated above, the images produced can be combined to provide real time tomographic imaging of the flow in the pipe.

Referring to FIG. 5, flow velocity can be determined by applying cross-correlation methods between identified features in the stack of image planes 28a, 28b that are generated along the length of the pipe 24 at different times. This allows the speed of movement of those features along the pipe to be determined. In the example shown, the gas bubble 34 shown in FIG. 3 moves up the pipe 24. At a reference time t=0 the bubble 34 reaches one of the image planes 28d. At the time of the next scan, at time t=0+.delta. the bubble 34 is partly in the image plane 28d, and partly in the adjacent image plane 28c. At the next scanning time t=0+2.delta. the bubble 34 is also partly in the next image plane 28b. Using cross correlation between the images in the planes 28a, 28b, 28c, 28d allows the bubble 34 to be identified as the same feature, and its position at the time of each scan to be determined. Using the change of position between scans and the scan frequency, the velocity of the bubble 34 along the pipe can be determined. The velocity of movement of the air, together with the volumetric fraction of the air obtained as described above, allow determination of the volumetric flow rate of air through the pipe 24, that is the volume of air flowing through the pipe per unit time.

In some simple flows it will be possible to use the technique described above to identify features of each of the oil, water and gas phases in the pipe and to measure their individual velocities. In other types of flow different techniques are required to determine the flow rates of all of the phases.

One technique is to include in the calculation the buoyancy of the various fractions. In the example shown in FIG. 5, if the gas bubble 34 is surrounded entirely by oil, then its speed of motion will be determined partly by its buoyancy and partly by the velocity and viscosity of the oil. As the approximate viscosity of the oil and the approximate densities of oil and water are known, measuring the speed of the bubble 34 can be used to measure the velocity of the oil.

Alternatively the density of each of the phases can be measured. The density of each phase is very closely related to its electron density, which determines the X-ray attenuation as measured by the scanner. Therefore the measured attenuation of each voxel can be used to determine the density of the fluid in it. The measured densities can then be used to determine the buoyancy of each of the fractions.

The viscosity of each of the phases can also be measured by measuring the rate of change of shape of the features of that phase. For substances of high viscosity, such as oil, the rate of change of shape will be relatively slow, whereas for substances of lower viscosity, such as water, the rate of change of shape will be relatively fast.

For complex flow patterns mathematical modeling of the flow can be used to determine the speeds of flow and flow rates of the different phases. A model can be built up which will calculate the size, shape and velocity of the regions of each fraction based on the flow rates of each of the fractions and other variables such as the pipe size, pipe orientation, and temperature. The known variables such as pipe size and temperature are input to the model. The size of any regions of each phase that can be measured, and the flow velocities of any of the phases that can be measured are matched to find a best fit with those calculated using the model for different flow rates using a 'least squares' or similar method to determine the actual flow rates. By repeating the best fit process the results produced can be averaged to improve the accuracy of the results. This modeling technique is particularly suitable for monitoring turbulent flow, or flow with high gas fractions where reverse flow can occur.

Figure 6:
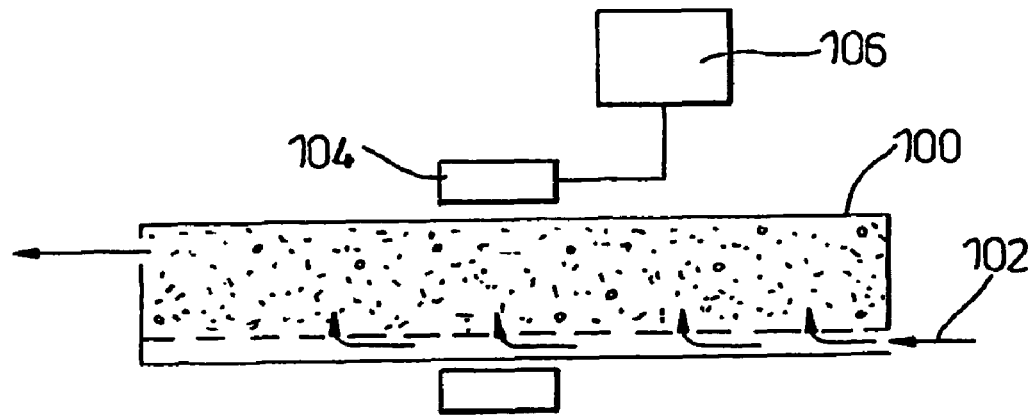
FIG. 6 is a schematic section through a scanning apparatus according to a second embodiment of the invention.

Referring to FIG. 6 in a second embodiment of the invention a bed 100 of powdered substances is fluidized by the passage of a gas 102 through it. The gas 102 acts as a catalyst for a chemical reaction. A scanner 104 operating in a similar manner to that of the first embodiment is placed around the fluidized bed 100 to produce real time tomographic imaging of the fluidized powder. This can be used to monitor and analyze the fluidization to ensure that it is functioning as required, using a control unit 106.

It will be appreciated that the method described above can be used for real time imaging, or measuring the movement of, a variety of substances in a variety of conditions. For example as well as monitoring or measuring liquid and gas flow, it can be used to measure powder flow, in which powder is carried in a gas, and slurry flow in which a powder is carried in a liquid. It can also be used to monitor other processes such as fluidization in which gas is passed through a powder or granular solid, for example to encourage a chemical reaction, and mixing processes to monitor how well different substances are being mixed together. Depending on the substances being monitored various other parameters can be analyzed from the data, such as the size and velocity of gas bubbles, of droplets or regions of liquid, or of solid particles, or the degree of mixing of the substances.

The invention claimed is:

1. A system for monitoring a plurality of substances in a mixture, having at least one fluid layer, along an axis of flow within a first tube, the system comprising:
   a. a first X-ray source positioned radially outward from said first tube;
   b. a second X-ray source positioned radially outward from said first tube;
   c. an annular sensor array positioned between said first tube and said first and second X-ray sources wherein said annular sensor array comprises a plurality of sensors arranged in at least one ring, and
   d. a controller for activating a first X-ray source when said second X-ray source is off and activating said second X-ray source when said first X-ray source is off, wherein said X-ray sources operate at a tube voltage in a range of 100 kVp to 150 kVp.

2. The system according to claim 1 wherein the system produces a scan data set relating to said at least one fluid layer of the mixture.

3. The system according to claim 2 wherein the controller is adapted to identify a plurality of volume elements in said layer and uses a measure of X-ray attenuation in each of said volume elements to form the scan data set.

4. The system according to claim 2 wherein the controller is adapted to determine an amount of at least one of the substances in said at least one fluid layer based on said scan data set.

5. The system according to claim 1 wherein at least one of said first and second X-ray sources generates a beam current of between 10 mA and 50 mA.

6. The system according to claim 1 wherein the controller is adapted to activate at least one of said first and second X-ray sources for a scan period in the range of 0.1 ms to 10 ms.

7. The system according to claim 1 wherein the system generates a plurality of image planes along said axis of flow within the first tube.

8. The system according to claim 7 wherein the system determines a flow velocity by cross-correlating at least one identified feature across each of said plurality of image planes.

9. The system according to claim 7 wherein the system determines a flow velocity based upon a scan frequency and a change of position of at least one identified feature across each of said plurality of image planes.

10. The system according to claim 1 wherein the sensor array comprises an image ring positioned at an angle from normal to the axis of flow within the first tube, wherein said angle is from 1 to 5 degrees.

11. The system according to claim 1 wherein the controller is adapted to conduct a first processing stage and a second processing stage, wherein said first processing stage determines relative volumes of said substances.

12. The system according to claim 11 wherein the second processing stage determines relative velocities of said substances.

13. The system according to claim 11 wherein, in the first processing stage, the controller generates at least two image reconstructions.

14. The system according to claim 13 wherein at least one of said two image reconstructions has a spatial resolution of up to 10 mm and wherein at least one of said two image reconstructions has a spatial resolution of up to 2 mm.

15. The system according to claim 1 wherein the controller is adapted to conduct a first processing stage and a second processing stage, wherein said first processing stage determines relative volumes of said substances.

16. The system according to claim 15 wherein the second processing stage determines relative velocities of said substances.

17. A system for monitoring a plurality of substances in a mixture, having at least one fluid layer, along an axis of flow within a first tube, the system comprising:
   a. a first X-ray source positioned radially outward from said first tube;
   b. a second X-ray source positioned radially outward from said first tube;
   c. an annular sensor array radially positioned between said first tube and said first and second X-ray sources wherein said annular sensor array comprises a plurality of sensors arranged in at least one ring, and
   d. a controller for activating a first X-ray source when said second X-ray source is off and activating said second X-ray source when said first X-ray source is off, wherein said X-ray sources generate a beam current of between 10 mA and 50 mA.

18. The system according to claim 17 wherein the system generates a plurality of image planes along said axis of flow within the first tube.

19. The system according to claim 18 wherein the system determines a flow velocity by cross-correlating at least one identified feature across each of said plurality of image planes.

20. The system according to claim 18 wherein the system determines a flow velocity based upon a scan frequency and a change of position of at least one identified feature across each of said plurality of image planes.

21. The system according to claim 18 wherein the sensor array comprises an image ring positioned at an angle from normal to the axis of flow within the first tube, wherein said angle is from 1 to 5 degrees.

* * * * *